(12) United States Patent
Liang

(10) Patent No.: US 7,542,550 B2
(45) Date of Patent: Jun. 2, 2009

(54) SYSTEM FOR TESTING SUBSCRIBER LINES AND METHOD THEREOF

(75) Inventor: Yong Liang, Shenzhen (CN)

(73) Assignee: Huawei Technologies Co., Ltd., Guangdong, P.R. (CN)

( * ) Notice: Subject to any disclaimer, the term of this patent is extended or adjusted under 35 U.S.C. 154(b) by 150 days.

(21) Appl. No.: 10/582,710

(22) PCT Filed: Oct. 25, 2004

(86) PCT No.: PCT/CN2004/001210

§ 371 (c)(1), (2), (4) Date: Jun. 12, 2006

(87) PCT Pub. No.: WO2005/057855

PCT Pub. Date: Jun. 23, 2005

(65) Prior Publication Data

US 2007/0147590 A1    Jun. 28, 2007

(30) Foreign Application Priority Data

Dec. 12, 2003    (CN) .................. 2003 1 0123620

(51) Int. Cl.
H04M 1/24    (2006.01)
H04M 3/08    (2006.01)
H04M 3/22    (2006.01)

(52) U.S. Cl. .................. 379/29.01; 379/1.03; 379/17; 379/27.06

(58) Field of Classification Search .................. 379/1.01, 379/1.03, 1.04, 16–17, 19–20, 22, 22.04, 379/26.01, 27.01, 27.06, 27.07, 28, 29.01
See application file for complete search history.

(56) References Cited

U.S. PATENT DOCUMENTS 6,181,775 B1 *    1/2001    Bella ....................... 379/29.01

(Continued)

FOREIGN PATENT DOCUMENTS

KR    20010055547    7/2001

(Continued)

OTHER PUBLICATIONS

Anonymous, "Handshake procedures for digital subscriber line (DSL) transceivers", G 994.1 International Telecommunication Union. Geneva, CH, May 2003, XP017401241.

(Continued)

Primary Examiner—Quoc D Tran
(74) Attorney, Agent, or Firm—Baker & Hostetler LLP

(57) ABSTRACT

The present invention discloses a system for testing subscriber lines and method thereof. The system includes a broadband line testing control module and a remote terminal subscriber access control module located at a subscriber line that is located between the broadband line testing control module and a remote terminal unit. The broadband line testing control module sends a signal of disconnecting the subscriber line to the remote terminal subscriber access control module, and tests the subscriber line. The remote terminal subscriber access control module receives said signal from the broadband line testing control module, and controls the remote terminal unit to disconnect from or connect to the subscriber line based on said signal. With the system and method according to the present invention, not only the precision of subscriber line testing is guaranteed, but also the subscriber lines can be periodically tested without manual operation.

10 Claims, 3 Drawing Sheets

U.S. PATENT DOCUMENTS

| | | | |
|---|---|---|---|
| 6,496,566 B1 * | 12/2002 | Posthuma | 379/22 |
| 6,754,309 B2 | 6/2004 | Nakagawa et al. | |
| 6,798,866 B1 * | 9/2004 | Tennyson et al. | 379/1.03 |
| 2002/0131568 A1 * | 9/2002 | Chea et al. | 379/93.14 |
| 2003/0063711 A1 * | 4/2003 | Ginesi et al. | 379/1.01 |
| 2003/0142811 A1 * | 7/2003 | Teixeira | 379/327 |
| 2003/0147507 A1 * | 8/2003 | Wang et al. | 379/22.04 |
| 2004/0062378 A1 | 4/2004 | Neuhausler et al. | |

FOREIGN PATENT DOCUMENTS

| | | |
|---|---|---|
| WO | WO 00/72495 A2 | 11/2000 |
| WO | WO 01/95598 A2 | 12/2001 |
| WO | WO 02/067562 A2 | 8/2002 |

OTHER PUBLICATIONS

Marshall, et al., ALE-Testing to the Customer Interface, British Telecommunications Engineering. London, GB, vol. 6, No. 1, Apr. 1987, pp. 50-56, XP002161746, ISSN: 0262-401X.

* cited by examiner

SYSTEM FOR TESTING SUBSCRIBER LINES AND METHOD THEREOF

CROSS-REFERENCE TO RELATED APPLICATIONS

This application is a National Stage of Patent Cooperation Treaty (PCT) Application No. PCT/CN2004/001210, filed on Oct. 25, 2004, entitled, A SYSTEM AND METHOD FOR TESTING THE SUBSCRIBER'S LINE, which claims priority to Chinese Patent Application 200310123620.6, filed on Dec. 12, 2003, all of the disclosure of both applications are hereby incorporated by reference in their entirety.

FIELD OF THE TECHNOLOGY

The present invention relates to testing technique in network communication, more particularly to a system for testing subscriber lines in network communication and method thereof.

BACKGROUND OF THE INVENTION

With the development of broadband access technology, Data Subscriber Loop (DSL) technology that is used for subscriber loop access is gradually becoming a main and widely applied broadband access technology. Subscriber lines are laid for common narrowband telephone service. However, frequency band and speed of DSL is 10 to 1000 times greater than that of common narrowband telephone service. Furthermore, development of DSL service is affected due to some problems concerning with subscriber lines, such as long-term laying, poor maintenance, large environment interference and long distance. In order to satisfy requirements for opening line pre-selection and breakdown maintenance of DSL service, subscriber line testing technique has gradually being developed.

At the present time, subscriber line testing technique has been highly valued by both device manufactures and telecom service providers, henceforth applied in a large scale.

Generally, a broadband line testing module for implementing subscriber line testing is placed in a Digital Subscriber Line Access Multiplexer (DSLAM) end. The broadband line testing module is connected to the subscriber lines to be tested, evaluating line quality and judging line breakdown by using different broadband testing techniques, thereby implementing single-terminal broadband testing for subscriber lines, as is shown in FIG. 1.

The object of subscriber line testing is to test those subscriber lines loading DSL. However, for the existence of Remote Terminal Unit (RTU) in user end, when breakdown is tested, there is no way to confirm whether the breakdown is from the subscriber line or RTU, thereby affecting precision of the present subscriber line testing technique, even disabling some certain subscriber line testing techniques. Consequently, when testing with the present subscriber line testing technique, the subscriber is often telephoned and required to manually disconnect RTU from the subscriber line; after completion of testing subscriber line procedure, the subscriber is telephoned again to connect RTU up. The RTU includes RTU of Asymmetrical Digital Subscriber Loop (ADSL), Very-high-speed Digital Subscriber Loop (VDSL), or Single-line-pair High-bit-rate Digital Subscriber Loop (SHDSL).

SUMMARY OF THE INVENTION

The present invention provides a system and a method for testing subscriber lines, with which subscriber line testing precision is guaranteed and subscriber lines can be periodically tested without manual operation.

The technical scheme of the present invention is implemented as follows.

A system for testing subscriber lines comprises a broadband line testing control module and a remote terminal subscriber access control module located at a subscriber line between the broadband line testing control module and a remote terminal unit, wherein said broadband line testing control module sends a signal of disconnecting the subscriber line to the remote terminal subscriber access control module, and tests the subscriber line;

said remote terminal subscriber access control module receives said signal from the broadband line testing control module, and controls the remote terminal unit to disconnect from or connect to the subscriber line based on said signal.

Said broadband line testing control module comprises:

a broadband line testing module, for sending a signal of disconnecting subscriber line, implementing performance testing for subscriber lines and obtaining testing results after the remote terminal unit is disconnected from the subscriber line; and a remote terminal subscriber control module, for receiving the signal of disconnecting subscriber line from the broadband line testing module and forwarding it to the remote terminal subscriber access control module.

Said remote terminal subscriber access control module comprises:

a switch control module, for receiving the signal from the broadband line testing control module, and generating a control signal and transmitting said control signal; and a remote terminal subscriber control switch, for receiving said control signal from the switch control module and disconnecting the remote terminal unit from the subscriber line based on said control signal.

Said switch control module comprises a timer circuit, and said timer circuit is triggered based on the signal sent by the broadband line testing control module, and determines time-out time based on the testing required time value which is carried in this signal; when overrunning the defined time-out time, the timer circuit notifies the switch control module to send the remote terminal subscriber control switch a control signal of setting it at off status;

said remote terminal subscriber control switch controls the remote terminal unit to connect to the subscriber line after receiving said control signal of setting the remote terminal subscriber control switch at off status from the switch control module.

Said remote terminal subscriber access control module is a relay.

Said broadband line testing control module is located in a Digital Subscriber Line Access Multiplexer (DSLAM);

said remote terminal subscriber access control module is located at the subscriber line between a splitter in user end and the remote terminal unit, or located at the subscriber line between the splitter in user end and the DSLAM.

A method for testing subscriber lines based on the above-mentioned comprises the following steps of:

A. a broadband line testing control module sends a signal of disconnecting subscriber line to a remote terminal subscriber access control module;

B. the remote terminal subscriber access control module disconnects a remote terminal unit from the subscriber line after receiving said signal of disconnecting subscriber line; and C. the broadband line testing control module tests the subscriber line.

Said signal is transmitted through a message based on G994.1 protocol.

The method further comprises before step A:

the broadband line testing control module sends a handshake message to the remote terminal unit, and determines whether said remote terminal unit supports the testing based on the returned message from the remote terminal unit, if yes, executes step A; otherwise, ends this processing.

Said signal in step A carries a testing required time value;

the method further comprises in step B:

after receiving the signal, the remote terminal subscriber access control module triggers a timer, and determines a time-out time based on the testing required time value which is carried in said signal;

when overrunning the time-out time, accesses the remote terminal unit to the subscriber line.

The method further comprises in step B:

when disconnecting the remote terminal unit from the subscriber line, said remote terminal subscriber access control module returns a response message to the broadband line testing control module;

the method further comprises before step C:

the broadband line testing control module receives the returned response message from the remote terminal subscriber access control module, and executes step C after delaying a defined time period.

Said sending a signal to a remote terminal subscriber access control module in step A is implemented through terminal managing channels of DSLAM.

It can be seen from the above-mentioned technical schemes, in the present invention, a remote terminal subscriber access control module is added at the subscriber line between an RTU and a broadband line testing control module, in this way, when the broadband testing control module starts to implement subscriber line testing, remote controlling RTU to automatically disconnect from the subscriber line can be realized through remotely controlling the switch status of the remote terminal subscriber access control module, and automatic connection between the RTU and the subscriber line can be restored after completion of subscriber line testing. Therefore, the problem of poor testing precision or unable to perform corresponding test due to the existence of RTU in subscriber line is effectively avoided. Meanwhile, since remote control of RTU's accessing to or disconnected from subscriber line is implemented in the present invention, the subscriber line testing performed by the broadband testing control module needs no manual operation, which is greatly convenient for periodically testing subscriber lines by DALAM end and recording subscriber line health file, henceforth in favor of real-time inspection of subscriber line quality and fast positioning of subscriber line breakdown.

DETAILED DESCRIPTION OF THE INVENTION

The present invention will be described in detail hereinafter with reference to the accompanying drawings.

According to the embodiments of the present invention, RTU is connected with the subscriber line via a relay. A broadband line testing control module in DSLAM remotely controls off/on status of this relay, thereby controls RTU to connect to or disconnect from the subscriber line, making it convenient for corresponding subscriber line testing.

Figure 1:
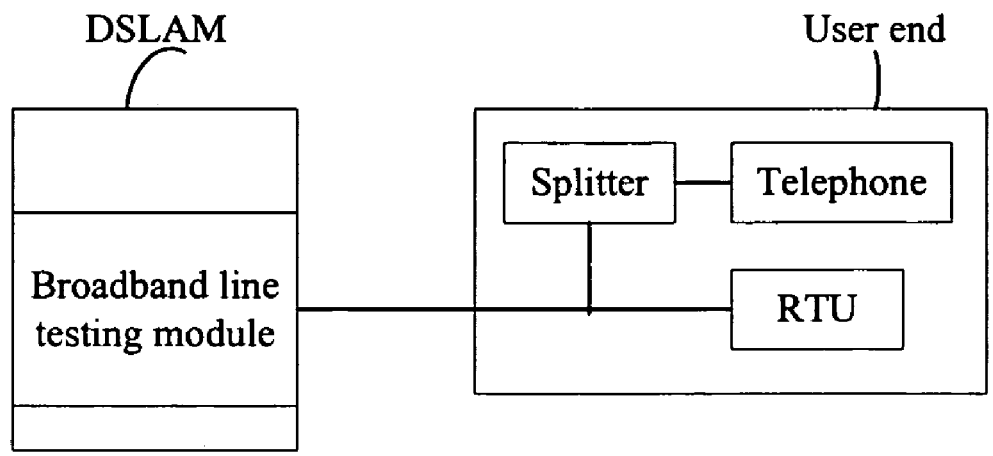
FIG. 1 is a schematic diagram illustrating system structure for testing subscriber lines according to the prior art.
Figure 2:
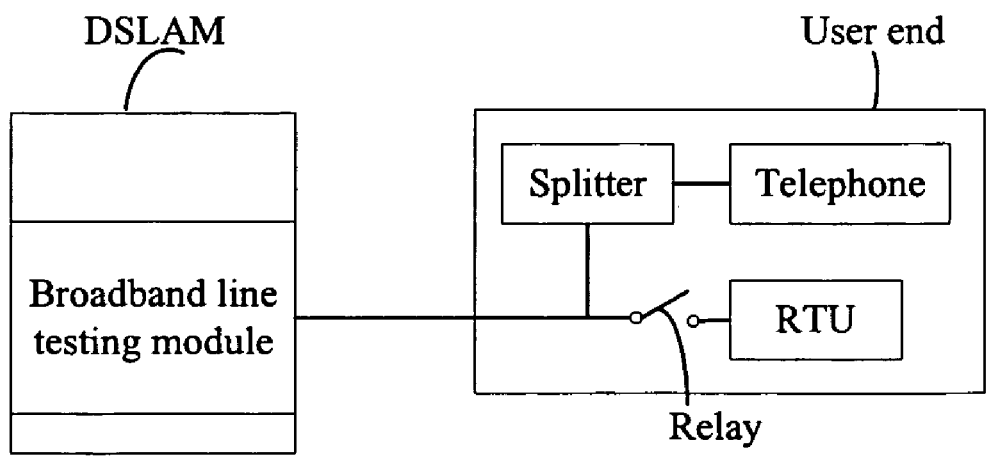
FIG. 2 is a schematic diagram illustrating brief system structure for testing subscriber lines according to the present invention.

As shown in FIG. 2, a relay is added between the RTU and the subscriber line in an exemplary embodiment of the present invention. When the subscriber line needs testing, the broadband line testing control module in DSLAM instructs the relay to switch its status, making RTU disconnect from the subscriber line. After overrunning a time-out time set by the DSLAM, the relay automatically switches its status again and restores the connection with subscriber line. So the RTU can be reconnected to the subscriber line after the testing and be operated normally.

The relay according to a preferred embodiment of the present invention can be set either on the subscriber line between the splitter at user side and the RTU, or on that between the splitter at user side and the DSLAM. The relay shown in FIG. 2 is set on the subscriber line between the splitter at user side and the RTU. If the relay is added on the subscriber line between the splitter at user side and the RTU, when the connection between this subscriber line and RTU is broken by the relay, the subscriber line is still connected to devices such as a splitter and a telephone that will affect the testing precision of this subscriber line. In contrast, if the relay is added on the subscriber line between the splitter at user side and the DSLAM, when the connection between this subscriber line and the RTU is broken by the relay, this subscriber line will not be connected to any device, hence high testing precision can be obtained.

In the following embodiment according to the present invention, the relay is set on the subscriber line between the splitter at user side and the RTU.

Figure 3:
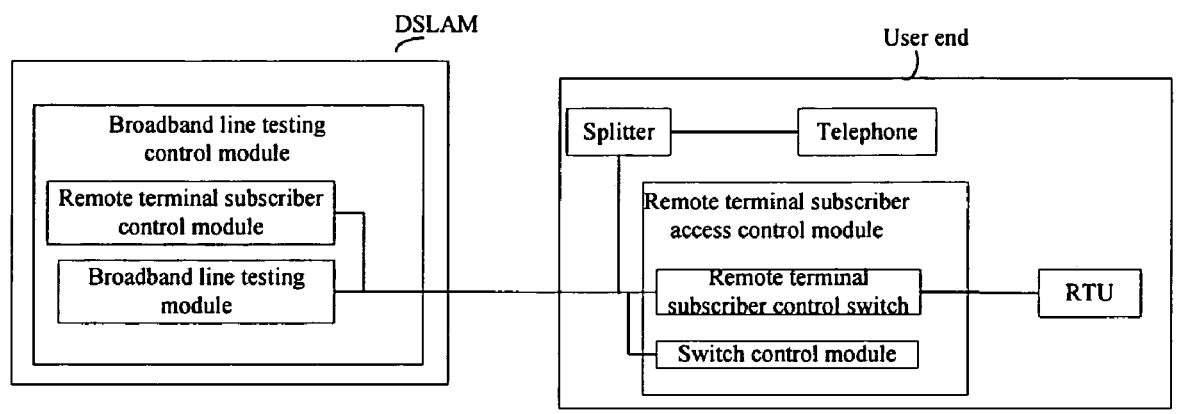
FIG. 3 is a schematic diagram illustrating detailed system structure for testing subscriber lines according to the present invention.

As shown in FIG. 3, a system for testing subscriber lines according to an exemplary embodiment of the present invention includes a broadband line testing control module and a remote terminal subscriber access control module which is placed between the broadband line testing control module and the RTU.

The broadband line testing control module is used to notify the remote terminal subscriber access control module to disconnect the RTU from the subscriber line when the subscriber line needs testing and start subscriber line testing. The control signals sent to the remote terminal subscriber access control module from the broadband line testing control module can either be inputted manually, or be automatically generated according to relevant condition. For example, the control signals for disconnecting the RTU from the subscriber line are periodically generated in order to test the subscriber lines periodically.

The broadband line testing control module further includes a broadband line testing module and a remote terminal subscriber control module.

The broadband line testing module is adapted to send a signal to the remote terminal subscriber control module so as to notify the remote terminal subscriber control module to disconnect the RTU from the subscriber line when the subscriber line needs testing, and to implement various performance test for the subscriber lines and hence obtains corresponding test results after the RTU has been disconnected from the subscriber line.

The remote terminal subscriber control module is adapted to send control signals to the remote terminal subscriber access control module through subscriber lines after receiving the signal for notifying subscriber line testing from the broadband line testing module. The control signals includes the control signals for controlling the RTU to disconnect from the subscriber lines, as well as the time period required for broadband testing which is used to determine the time point to reconnect itself to the subscriber lines by the RTU.

In the exemplary embodiment of the present invention, a remote terminal subscriber access control module is provided for receiving control signals from the broadband line testing control module, and controlling the RTU to connect to or disconnect from the subscriber lines based on the received signals. The remote terminal subscriber access control module further includes a switch control module and a remote terminal subscriber control switch.

The switch control module is used to receive signals from the broadband line testing control module, generate corresponding control signals and send the control signals to the remote terminal subscriber control switch, so as to control the off/on status of the remote terminal subscriber control switch, thereby controlling the RTU to connect to or disconnect from the subscriber lines.

The remote terminal subscriber control switch is used to switch the on off state based on the control signals from the switch control module. If the on state is required, the RTU disconnects from the subscriber lines. In contrast, if the off state is required, the RTU connects to the subscriber lines.

The switch control module may include a timer circuit, which is triggered based on the received signal from the remote terminal subscriber control module. The switch control module determines corresponding time-out time according to the information carried by the signal, and sends a control signal for asking the remote terminal subscriber control module to change its status to the remote terminal subscriber control module when the timer in the timer circuit overruns. As to the broadband line testing module of the system provided in the present invention, the time period required for testing is carried in the signal sent to the remote terminal subscriber control module only when it is required to perform subscriber line testing. In this way, at the user end, when the timer overruns, the switch control module can automatically control the remote terminal subscriber control switch to return to normal status, namely reconnecting the RTU to the subscriber lines.

The remote terminal subscriber access control module can be a relay or any other device with similar function to that of a relay.

In the system for testing subscriber lines in network communication, the broadband line testing control module is set in the DSLAM; the remote terminal subscriber access control module is located between the subscriber line at user end and the RTU, or set inside the RTU.

Figure 4:
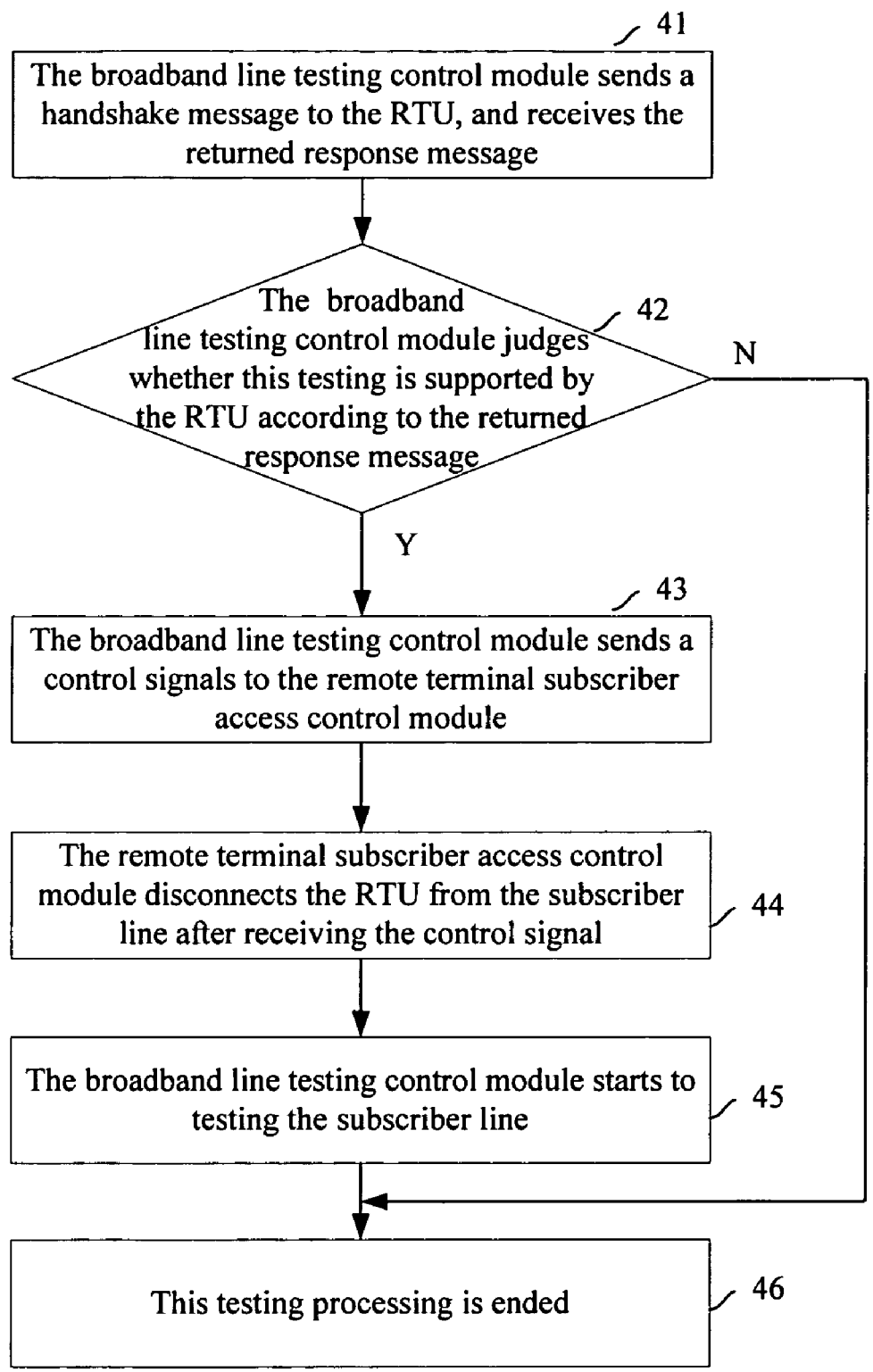
FIG. 4 is a flowchart illustrating the method for testing subscriber lines according to the present invention.

As shown in FIG. 4, a method for testing subscriber lines in network communication based on the above system includes the following steps.

In step 41, when it is determined that the subscriber line needs testing, the broadband line testing control module sends a handshake message to the RTU, and receives the returned response message to judge whether this testing is supported by the RTU.

Before testing, G.994.1 standard is executed to perform handshake operation between the broadband line testing control module and the RTU. The broadband line testing control module and the RTU exchange the message indicating whether testing switch is supported through G994.1 Protocol.

In step 42, the broadband line testing control module determines whether this testing is supported by the RTU according to the returned response message from the RTU, if yes, step 43 will be executed for the RTU supporting this testing, otherwise step 46 will be executed.

If the RTU supports testing switch, the seventh bit of "Identification field-Npar (1)" of Capability List Request (CRL) in G.994.1 is set at 1; meanwhile a command for indicating that RTU supports testing switch is defined in "Non-standard field" in G.994.1 frame. While at DSLAM end, if the DSLAM is to perform testing switch handshake, the seventh bit of "Identification field-Npar (1)" of Capability List (CL) is set at 1, meanwhile a command for indicating that DSLAM requests the RTU to perform testing switch and simultaneously notifies the RTU with the elapse time between switch off and switch back to the normal mode is defined in "Non-standard field" in G.994.1 frame.

After G.994.1 protocol is executed, if the seventh bit of the NPar(1) which is received by the broadband line testing control module in the DSLAM from the RTU is 1, the broadband line testing control module reads the command in "Non-standard field", if the command indicates that RTU supports this testing switch, step 43 will be executed, otherwise step 46 will be executed.

If the signal sent by the broadband line testing control module in DALAM from the RUT is not a CLR frame, it is necessary for the broadband line testing control module to send the RTU a CLR frame request message for requesting the RTU to send a CLR frame. After receiving the CLR frame, the broadband line testing control module implements the above processing.

In step 43, the broadband line testing control module sends a control signal bearing the time period for testing to the remote terminal subscriber access control module.

The above-mentioned control signal can be sent to the remote terminal subscriber access control module by means of a message based on G.994.1 protocol.

The above-mentioned control signal is used to ask the RTU to perform testing switch, namely to disconnect from the subscriber line, and to notify the RTU with a switch restoring time, namely the time point to reconnect the RTU back to the subscriber line. The above-mentioned control signal is a CL command sent from the DSLAM, including a switch starting command and a switch time in "Non-standard field" of the frame.

In step 44, the remote terminal subscriber access control module disconnects the RTU from the subscriber line after receiving the control signal.

Meanwhile, after receiving the control signal, the remote terminal subscriber access control module starts a timer and sets a time-out time according to the testing time period carried by the received control signal. When the timer overruns, the remote terminal subscriber access control module reconnects the RTU to the subscriber line, In addition, before the remote terminal subscriber access control module disconnects the RTU from the subscriber line, step 44 may further includes the step of returning a response message to the broadband line testing control module to notify it that the RTU has been disconnected from the subscriber line.

After receiving the CL command of DSLAM, the remote terminal subscriber access control module sends an acknowledgement message (ACK (1)) to the DALAM and starts testing switch simultaneously. After the testing switch of RTU, the remote terminal subscriber access control module starts timing according to the information carried in the CL command, if the time period set in the CL command is over, the RTU is switched back to normal access status and reconnected to the subscriber line.

In step 45, after the RTU is disconnected from the subscriber line, the broadband line testing module in the broadband line testing control module starts to test the subscriber line.

Corresponding to step 44, after receiving the returned response message from the remote terminal subscriber access control module and after a delay, the broadband line testing module in the broadband line testing control module starts to test the subscriber line, in order to make sure that the RTU has been safely disconnected from the subscriber line, accordingly guaranteeing the precision of corresponding testing results.

In other words, after receiving ACK(1) sent by the RTU and after a delay, the broadband line testing module in the broadband line testing control module starts testing for broadband testing items.

In step 46, this testing processing is ended.

If the broadband line testing control module in DSLAM determines that testing switch function is not supported by the RTU, it displays the information that testing switch function is not supported by the RTU when this testing processing is ended.

Under the active state of RTU, the broadband line testing control module can send "testing switch and testing switch time" command to the RTU by way of the terminal managing channels of each port of each XDSL service sub-board in the DSLAM.

In the present invention, the above-mentioned RTU can be RTU of ADSL, VDSL or SHDSL.

While the invention has been shown and described with reference to a preferred embodiment thereof, it will be understood by those skilled in the art that various changes in form and details may be made therein without departing from the spirit and scope of the invention as defined by the appended claims.

The invention claimed is:

1. A system for testing subscriber lines, comprising a broadband line testing control module in a Digital Subscriber Line Access Multiplexer (DSLAM), and a remote terminal subscriber access control module located at a subscriber line between a splitter in a user end and the DSLAM, wherein
said broadband line testing control module is configured to send a signal of disconnecting the subscriber line between the broadband line testing control module and the splitter to the remote terminal subscriber access control module through a terminal managing channel of the DSLAM, and test the subscriber line by a one-end test;
said remote terminal subscriber access control module is configured to receive said signal from the broadband line testing control module, and control the splitter and the remote terminal unit to disconnect from the subscriber line based on said signal.

2. The system of claim 1, wherein said broadband line testing control module comprises:
a broadband line testing module, configured to send the signal of disconnecting the subscriber line, implement the performance testing for the subscriber line and obtain a testing result after the splitter and the remote terminal unit is disconnected from the subscriber line; and
a remote terminal subscriber control module, configured to receive the signal of disconnecting the subscriber line from the broadband line testing module and forward the signal of disconnecting the subscriber line to the remote terminal subscriber access control module through the terminal managing channel of the DSLAM.

3. The system of claim 1, wherein said remote terminal subscriber access control module comprises:
a switch control module, configured to receive the signal from the broadband line testing control module through the terminal management channel of the DSLAM, and generate a control signal and transmit said control signal; and
a remote terminal subscriber control switch, configured to receive said control signal from the switch control module and disconnect the splitter and the remote terminal unit from the subscriber line based on said control signal.

4. The system of claim 3, wherein:
said switch control module comprises a timer circuit, and said timer circuit is triggered based on the signal sent by the broadband line testing control module, and determines time-out time based on the testing required time value which is carried in this signal; when overrunning the defined time-out time, the timer circuit notifies the switch control module to send the remote terminal subscriber control switch a control signal of setting it at off status;
said remote terminal subscriber control switch controls the remote terminal unit to connect to the subscriber line after receiving said control signal of setting the remote terminal subscriber control switch at off status from the switch control module.

5. The system of claim 1, wherein said remote terminal subscriber access control module is a relay.

6. A method for testing subscriber lines based on the system of claim 1, comprising:
a broadband line testing control module sending a signal of disconnecting subscriber line between the broadband line testing control module and a splitter in a user end to a remote terminal subscriber access control module through a terminal managing channel of a Digital Subscriber Line Access Multiplexer (DSLAM);
the remote terminal subscriber access control module disconnecting the splitter and a remote terminal unit from the subscriber line after receiving said signal of disconnecting subscriber line; and
the broadband line testing control module testing the subscriber line.

7. The method of claim 6, wherein said signal is transmitted through a message based on G994.1 protocol.

8. The method of claim 6, further comprising:
the broadband line testing control module sending a handshake message to the remote terminal unit, and determining whether said remote terminal unit supports the testing based on the returned message from the remote terminal unit, if yes, sending the signal of disconnecting subscriber line to the remote terminal subscriber access control module; otherwise ending this processing.

9. The method of claim 6, wherein:

said signal of disconnecting subscriber line carries a testing required time value;

further comprises:

after receiving the signal, the remote terminal subscriber access control module triggering a timer, and determining a time-out time based on the testing required time value which is carried in said signal;

when overrunning the time-out time, accessing the remote terminal unit to the subscriber line.

10. The method of claim 6, further comprising:

when disconnecting the remote terminal unit from the subscriber line, said remote terminal subscriber access control module returning a response message to the broadband line testing control module;

further comprising:

the broadband line testing control module receiving the returned response message from the remote terminal subscriber access control module, and testing the subscriber line after delaying a defined time period.

* * * * *